(12) United States Patent
Roberts

(10) Patent No.: US 10,650,651 B1
(45) Date of Patent: May 12, 2020

(54) AUTOMATED GEOSPATIAL SECURITY EVENT GROUPING

(71) Applicant: SureView Systems, Inc., Tampa, FL (US)

(72) Inventor: Paul Roberts, St. Petersburg, FL (US)

(73) Assignee: SureView Systems, Inc., Tampa, FL (US)

( * ) Notice: Subject to any disclaimer, the term of this patent is extended or adjusted under 35 U.S.C. 154(b) by 0 days.

(21) Appl. No.: 15/941,051

(22) Filed: Mar. 30, 2018

(51) Int. Cl.
*G08B 13/196* (2006.01)
*G06K 9/00* (2006.01)

(52) U.S. Cl.
CPC ... *G08B 13/19673* (2013.01); *G06K 9/00771* (2013.01); *G08B 13/19652* (2013.01); *G08B 13/19693* (2013.01)

(58) Field of Classification Search
CPC ........ G08B 13/19673; G08B 13/19652; G08B 13/19693; G06K 9/00771
See application file for complete search history.

(56) References Cited

U.S. PATENT DOCUMENTS

2016/0364129 A1\* 12/2016 McLean ................. G06F 16/71

\* cited by examiner

*Primary Examiner* — Joseph W Becker
(74) *Attorney, Agent, or Firm* — Nicholas Pfeifer; Smith & Hopen, P.A.

(57) ABSTRACT

A novel method and system for constantly monitoring security-monitoring assets (SMAs) and automatically determining whether security alerts are related to the same security event. The invention improves on existing technology by automatically assessing the geospatial location data of any SMAs responsible for initiating a security alert. The system automatically determines if any of the security alerts are related based on their proximity and the elapsed time between security alerts. If the security alerts occur within the defined proximity (relational zone) and/or relational timeframe, they are automatically grouped together to be processed as a single security event. Depending on the type of security alert, the system may rely solely on proximity or elapsed time. The system is constantly updating to ensure that proper associations are maintained at all times.

13 Claims, 6 Drawing Sheets

AUTOMATED GEOSPATIAL SECURITY EVENT GROUPING

BACKGROUND OF THE INVENTION

1. Field of the Invention

This invention relates, generally, to security systems. More specifically, it relates to an automated security event grouping system adapted to overcome the typical errors when assessed by human operators.

2. Brief Description of the Prior Art

Effectively securing an asset or facility typically requires numerous and various types of security systems, most of which are disparate systems lacking an ability to easily interact with each other. Ideally, these disparate security systems can be monitored and controlled by a single security-monitoring platform (SMP). An SMP is designed to integrate disparate security systems by aggregating system-specific information for each security system into a single interface. Effectively, the SMP provides SMP operators with an enhanced level of situational awareness when responding to security alerts.

Security systems include, but are not limited to, video systems to provide visual information, door access control systems to control who can access the location or areas within, intrusion detection systems to detect intruders (for example motion detection sensors or thermal detection sensors), audio systems to provide one-way or two-way audio communications, lone worker GPS-enabled devices with a panic button for guards, and situational awareness systems to provide information outside of traditional alarm sources, such as earthquake and weather warnings. Each security system usually contains several types of security-monitoring assets (SMAs). An SMA includes, but is not limited to, any alarm source (also referred to as "security alert source"), video source, output, security personnel, or audio source used to secure an object, facility, or person. Each security-monitoring asset provides different operational capabilities, including but not limited to:

- Security alert sources 103: when triggered raise an alert (such as a door or window being forced or a motion sensor being triggered) to the SMP operator, which the operator must process. The security alerts can also include location information if the security alert source is moving, such as a vehicle moving outside of a geofence or a mobile guard who has raised an SOS alarm. Some exemplary security alert sources include motion sensors, window/door entry sensor, and infrared sensors.
- Cameras 104: allow the operator to view what is happening at a location.
- Audio inputs and outputs 105: allow the SMP operator to hear what is happening at the location and also transmit sound to the location, respectively (e.g., intercoms to verify someone's identity and then let them in, and public-address systems to transmit a warning and scare off a potential intruder).
- Outputs and doors 106: allow the operator to control various systems e.g., opening gates, turning on lights, and granting access to doors.
- Security guards 107: the SMP operator can directly contact guards via a communication systems integrated with the SMP to either warn them of the security event or have them participate in the processing of the event as a local resource. The term "security guard" includes both human and robotic guards.

Typically, the various security systems by themselves lack the necessary hardware and software to interact with other security systems. For that reason, SMPs are designed to integrate several security systems into a single, more easily managed platform. Each security system includes a system-specific application programming interface (API). The API for each security system is unique to that security system, but each API provides the necessary communicability to enable a user to control and utilize the security system. For example, an API can create (1) a connection to web services inside the security system allowing a user to execute commands to query and control the security system's security-monitoring assets, (2) a connection to the data store of the security system, and/or (3) a proprietary connection through a software development kit (SDK) with functions allowing a user to query and control the security system's SMAs.

Some APIs are configured to send regular "heartbeat" messages that inform the SMP of the status of a particular SMA. Moreover, SMAs may include location-based technology configured to exchange location-based information with the SMP. As a result, the SMP can pinpoint the location and movement of the SMAs and present the SMP operator or security guards with the most relevant information to properly address the security alert.

Referring to FIG. 1, a simplified exemplary illustration of the communication structure between SMAs and the SMP includes SMP 101 in communication with security systems 102, and in turn their respective SMAs 103-106. SMP 101 is also in communication with security guards 107 via the mobile devices carried by human guards or location-based technology integrated with or carried by robotic guards. Once connected, SMP operator 108 is capable of interacting with a particular SMA 103-106 and security guard 107.

As security events occur, the SMP presents information pertaining to the SMA that caused the security alert to the SMP operator. The SMP operator then processes the security event and determines whether the security alert is valid or a false alarm and how to handle the security event. Often, several security events wind up being related to each other. For example, an intruder may first force open an exterior door, causing a security alert, and then may also set off motion detection alarms inside the building. The SMP, however, is not capable of determining whether security alerts are related and is programed to present each of them to the SMP operator as if they are all unrelated. The SMP operator must then determine if any security alerts are unique to a specific security event or if any of them are related to the same security event.

Reliance on the SMP operator to determine whether multiple security alerts are related to the same security event can be very time-intensive and is subject to human error on account of the fact that the decision is often a judgement call with minimal information to know for sure if the security alerts are related. Building on the previous example with an intruder forcing an exterior door open and then triggering interior motion detection, the SMP operator will likely experience the following scenario: when reviewing the cameras for the forced door event the operator may see heavy winds affecting trees and falsely decide that the wind forced the door open, rather than an intruder. Such a conclusion could also lead to the SMP operator falsely assuming that the motion detection event was also caused by the same environmental issue. The SMP operator may then opt to forego reviewing the interior cameras, which would show an intruder, and ultimately close both events in the SMP for being false alarms and leave an intruder in the building.

Existing monitoring platforms attempt to overcome this issue by grouping security events by building, however this also has issues when dealing with extremely large buildings such as distribution warehouses because an event occurring at one end of the large building is likely nothing to do with another event occurring at the other end of the building. For example, a motion detection at one end of the building could occur and upon reviewing the cameras it could be determined to a false alarm due to a mouse; meanwhile a motion detection at the other end of the building, a few thousand feet away, may have been caused by a legitimate intruder. So, grouping these events together based on their proximity in the same building is prone to errors, especially when there is a large distance between the events.

Accordingly, what is needed is a system and method that can better group security alerts arising from the same security event without human intervention. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an automatic and more effective method and system for properly relating security alerts to a particular security event is now met by a new, useful, and nonobvious invention.

The novel method includes receiving an active security alert from a SMA and receiving or retrieving location information for the SMA. The location information is received if it is sent with the security alert using location-based technology. The location information is retrieved from a data store if the location-based technology is not present or is not currently working.

The next step includes determining if there are any prior security alerts that were triggered within a defined timespan. If there are prior security alerts that were triggered within a defined timespan, both the relational zone and the relational timeframe for a most recent prior security alert are retrieved. It is then determined whether the active security alert occurred within the relational timeframe and if so, whether the active security alert occurred within the relational timeframe. If both requirements are met, the new security alert is grouped with the prior security alert into a single security event for processing through the SMP.

An embodiment may include the steps of disregarding the prior security alert if the active security alert occurred outside of the relational zone or if the active security alert occurred outside of the relational timeframe; and reverting back to the step of determining if there are any prior security alerts that were triggered within a defined timespan, wherein the disregarded prior security alert is not considered.

An embodiment further includes the step of creating a new security event for processing through the SMP if the active security alert occurred outside of the relational zone and there are no more prior security alerts that were triggered within the defined timespan. The creation of a new security event for processing through the SMP may also occur if the active security alert occurred outside of the relational zone. Moreover, a new security event is created for processing through the SMP if there are no prior security alerts that were triggered within the defined timespan.

An embodiment may, consider whether the location of the prior security alert is within a relational zone of the active security alert, rather than or in addition to, determining whether the location of the active security alert is within a relational zone of the prior security alert. In turn, the new security alert is grouped with the prior security alert into a single security event for processing through the SMP if the active security alert occurred within the relational zone.

The additional steps include disregarding the prior security alert if the active security alert occurred outside of the relational zone or if the prior security alert occurred outside of the relational timeframe of the active security alert; and reverting back to the step of determining if there are any prior security alerts that were triggered within a defined timespan, wherein the disregarded prior security alert is not considered. A new security event is created for processing through the SMP if the prior security alert occurred outside of the relational zone of the active security alert and there are no more prior security alerts that were triggered within the defined timespan.

The novel automated system for grouping security alerts into a single security event to be processed on a SMP includes a plurality of SMAs and a SMP. Each SMA has a location-based technology and the SMP can receive an active security alert and location-based information from a SMA. The system is configured to perform the following steps in response to the security-monitoring platform receiving an active security alert from one of the SMAs: receiving location information for the SMA that triggered the active security alert; determining if there are any prior security alerts that were triggered within a defined timespan; if there are prior security alerts that were triggered within a defined timespan, retrieving the relational timeframe for a most recent prior security alert; determining if the active security alert occurred within the relational timeframe; determining if the SMA responsible for the active security alert occurred with a relational zone of the prior security alert or if the prior security alert occurred within a relational zone of the active security alert; and grouping the new security alert with the prior security alert into a single security event for processing through the SMP if the SMA responsible for the active security alert occurred with the relational zone of the prior security alert or if the prior security alert occurred within the relational zone of the active security alert.

The system may further be configured to access a data store in which the location information, the relational zones, and the relational timeframes for each SMA/security alert are stored.

An object of the invention is to provide a security monitoring system configured to automatically and dynamically grouped related security alerts into a single security event to be processed by a SMP operator.

A further object of the invention is to significantly reduce the time that an SMP operator wastes handling several security alerts as if they are distinct security events when they are related to the same security event.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a novel method and system for constantly monitoring security-monitoring assets (SMAs) and automatically determining whether security alerts are related to the same security event. The invention improves on existing technology by automatically assessing the geospatial location data of any SMAs responsible for initiating a security alert. The system automatically determines if any of the security alerts are related based on their proximity and the elapsed time between security alerts. If the security alerts occur within the defined proximity or time frame, they are automatically grouped together to be processed as a single security event. Depending on the type of security alert, the system may rely solely on proximity or elapsed time.

Figure 1:
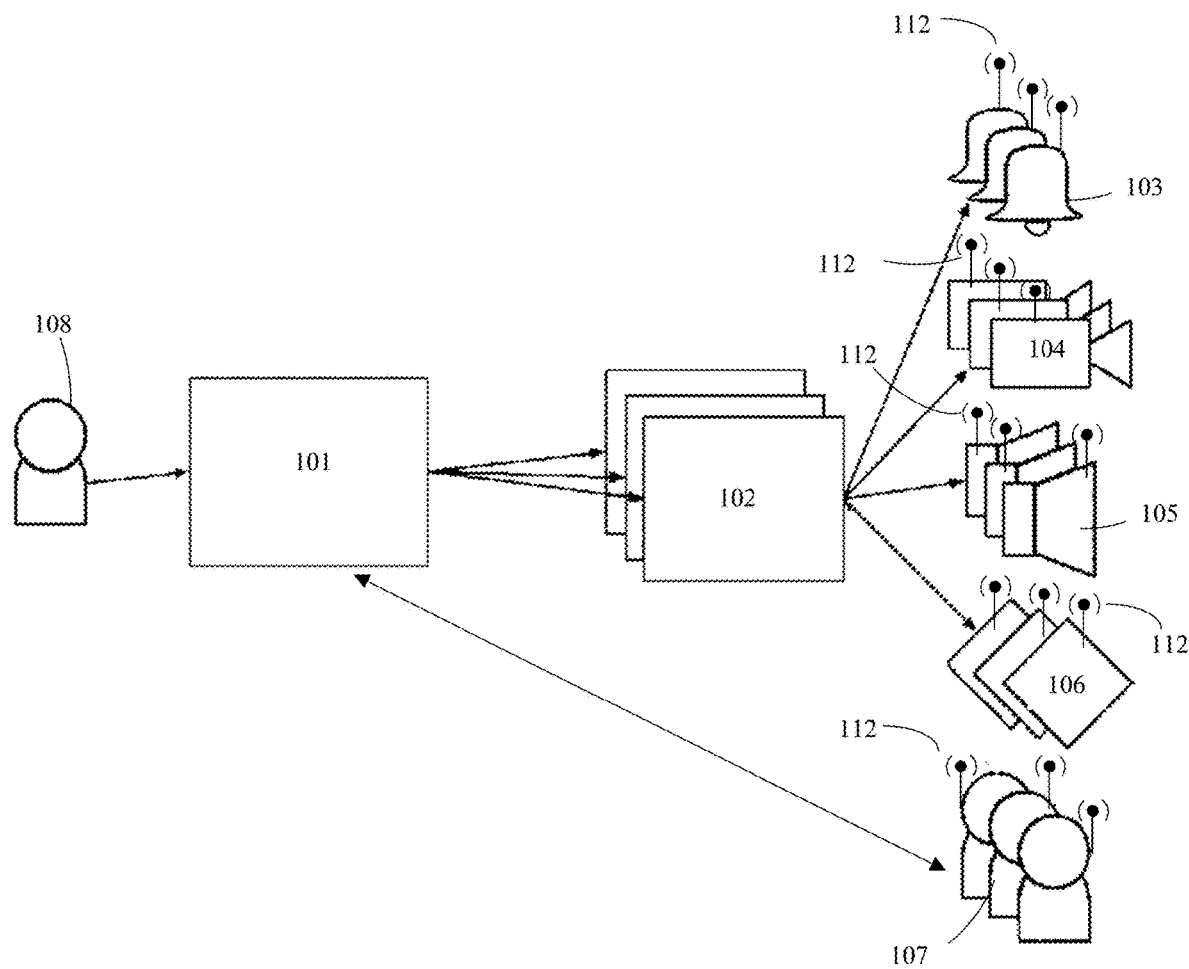
FIG. 1 is an example of a communication structure between an SMP and SMAs.

As depicted in FIG. 1, the novel system includes a SMP in communication with a plurality of security systems, each having a plurality of SMAs. Each SMA 103-106 includes location-based technology 112 to provide the SMP 101 with, preferably, a constant stream of up-to-date location information and/or movement information. The location-based information for each SMA may be stored in a data store in case one or more SMA does not include location-based technology or the location-based technology becomes inoperable. Location based-technology may include, but is not limited to, a GPS, compass, altimeter, gyroscope, RFID tags, and accelerometer. While robotic security guards may include location-based technology integrated therein, human security guards may carry mobile communication devices containing location-based technology which are configured to communicate with the SMP.

The location information of the security alert is either provided with the alert by the integrated alarm system (especially for systems that alert on non-typical events such as earthquakes and protests), or is previously provided when setting up the monitoring platform by users entering the location of the alarm sources, especially for static event sources, such as doors, cameras, and infrared detectors.

When an event occurs, the novel system uses the location information for the alerting SMA and automatically evaluates if there are other previous or currently alerting SMAs that, depending on the type, have occurred within a given radius and within a given duration, such that the two alerts should be grouped under the same security event. For example, a forced door alert would be automatically grouped with other events that occur within a certain radius, e.g., 30 feet, and a certain timeframe, e.g., within 30 minutes of the initiation of the forced door alert. As another example, an earthquake alert would be grouped with any other alerts generated within a 100-mile radius and a 5-minute timeframe.

The automated correlation feature eliminates the issues enumerated above that are associated with SMP operators manually deciding whether security alerts are related to a single security event and performs the task instantly to avoid any critical delays in addressing security concerns. The automated correlation feature also improves the accuracy of the correlations and reduces the issues associated with grouping all alerts from the same building together as a single event. Specifically, the present invention provides automatic grouping and separation of nearby versus distant alerts, regardless of being in the same building.

Figure 2A:
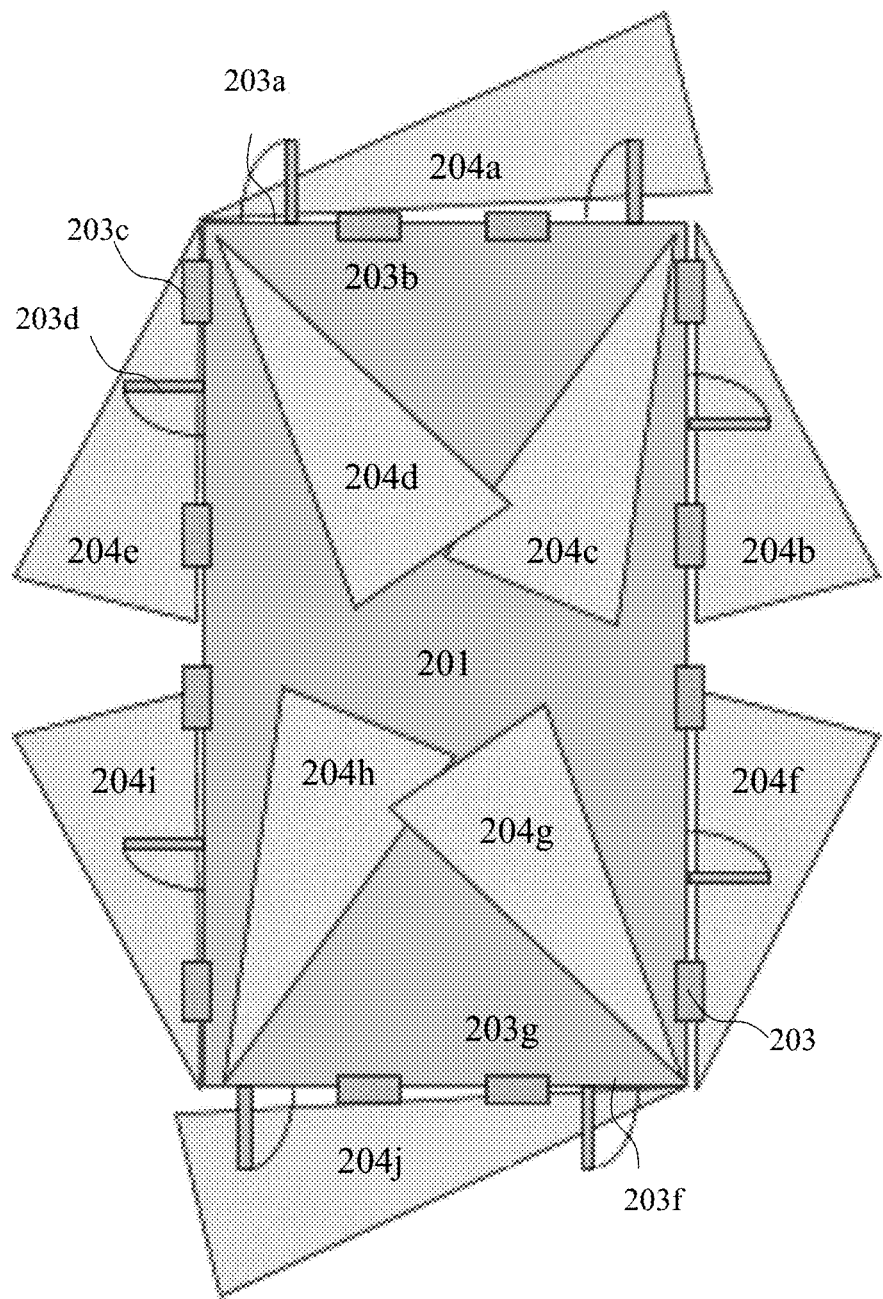
FIG. 2A is a simplified illustration of a building being monitored by security systems.

Referring now to FIG. 2, an overly simplified plan view of a large, e.g., 1,200,000 square feet, facility 201 is depicted with several SMAs 203-204 securing the facility. Specifically, building 201 includes security alert sources 203*a*-203*g* and cameras 204*a*-204*j*. Some of the security alert sources that are employed on the various windows and doors do not include reference numerals to avoid congestion and improve clarity. It should also be noted that various other types of SMAs would typically be present, but are not depicted to avoid over congestion.

SMAs 203-204 are in communication with an SMP as explained in the description of FIG. 1. Referring back to FIG. 2A, consider the current state of the art in response to exterior camera 204*a* detecting motion and sending a security alert to the SMP, and shortly afterwards, e.g., thirty seconds, door alarm 203*f* being triggered on the complete opposite side of 1,200,000 building 201, roughly 6,000 feet from the first security alert. Under the current state of the art, the SMP would group the two alerts into a single security event for the SMP operator to process. If the SMP operator decides to view the footage from camera 204*a* and determines that an animal set off the security alert, the SMP operator may not consider taking additional measures to determine the source of the door alarm 203*f* and may close the security event indicating that there is no security breach. However, door alarm 203*f* may be an actual intruder. Unfortunately, this problem is longstanding and commonplace in the security industry.

The present invention overcomes this problem. First, each of the SMAs includes location-based technology to provide an up-to-date location or includes location information stored in a data store accessible by the SMP. Locational boundaries are established for each type of security alert to establish a zone in which security alerts are deemed to be related, referred to as relational zones. These relational zones may simply be a circular boundary extending outward a particular distance from the location of security alert or may have more complex shapes. Moreover, the relational zones may be customizable based on location or type of SMA. Furthermore, the relational zones may be adjusted or customized for each SMA, regardless of the type.

Figure 2B:
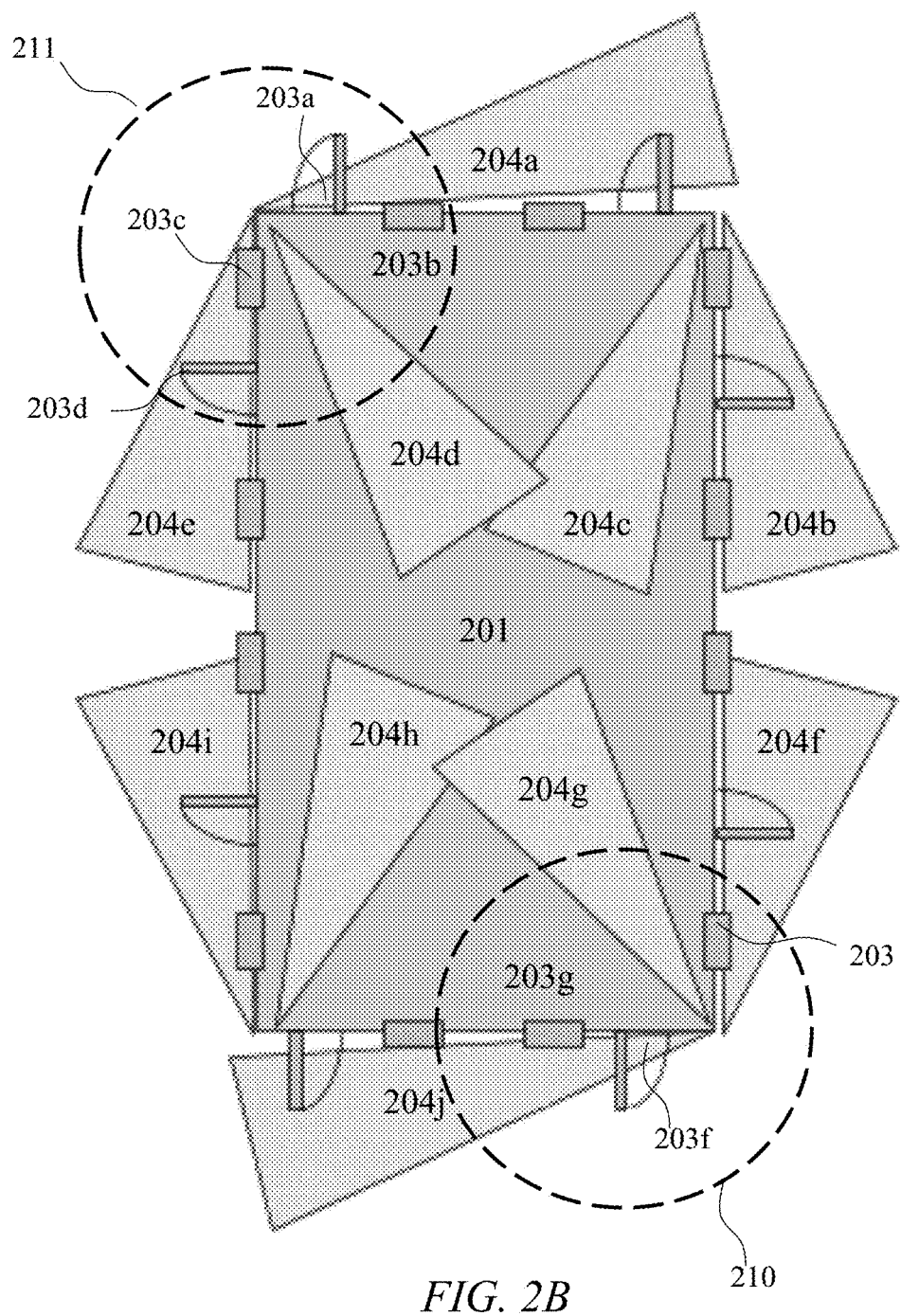
FIG. 2B is a depiction of the same building provided in FIG. 2A with a representative relational zone overlaying the illustration.

Referring now to FIG. 2B, relational zones 210, 211 are illustrated to aid in the description of the present invention. Relational zone 210 corresponds to door 203*f* and relational zone 211 corresponds to camera 204*a*. Following the same set of facts as presented above, when camera 204*a* detects motion and alerts the SMP. Door alarm 203*f* shortly after alerts the SMP of a door breach. The present invention determines the location of camera 204*a* using the location-based technology the stored location information and compares it to the location of door alarm 203*f* using the location-based technology the stored location information. The system would then retrieve the relational zones and see if both of camera 204*a* and door alarm 203*f* are located within one of either of the relational zones. Determining that not to be the case, two independent security events are provided to the SMP operator. In contrast, if the second security alert had been door alarm 203*a*, which is located within relational zone 211, it would have been linked to the motion sensor alert from camera 204*a* and both security alerts would have been identified as being related to a single security event.

Figure 3A:
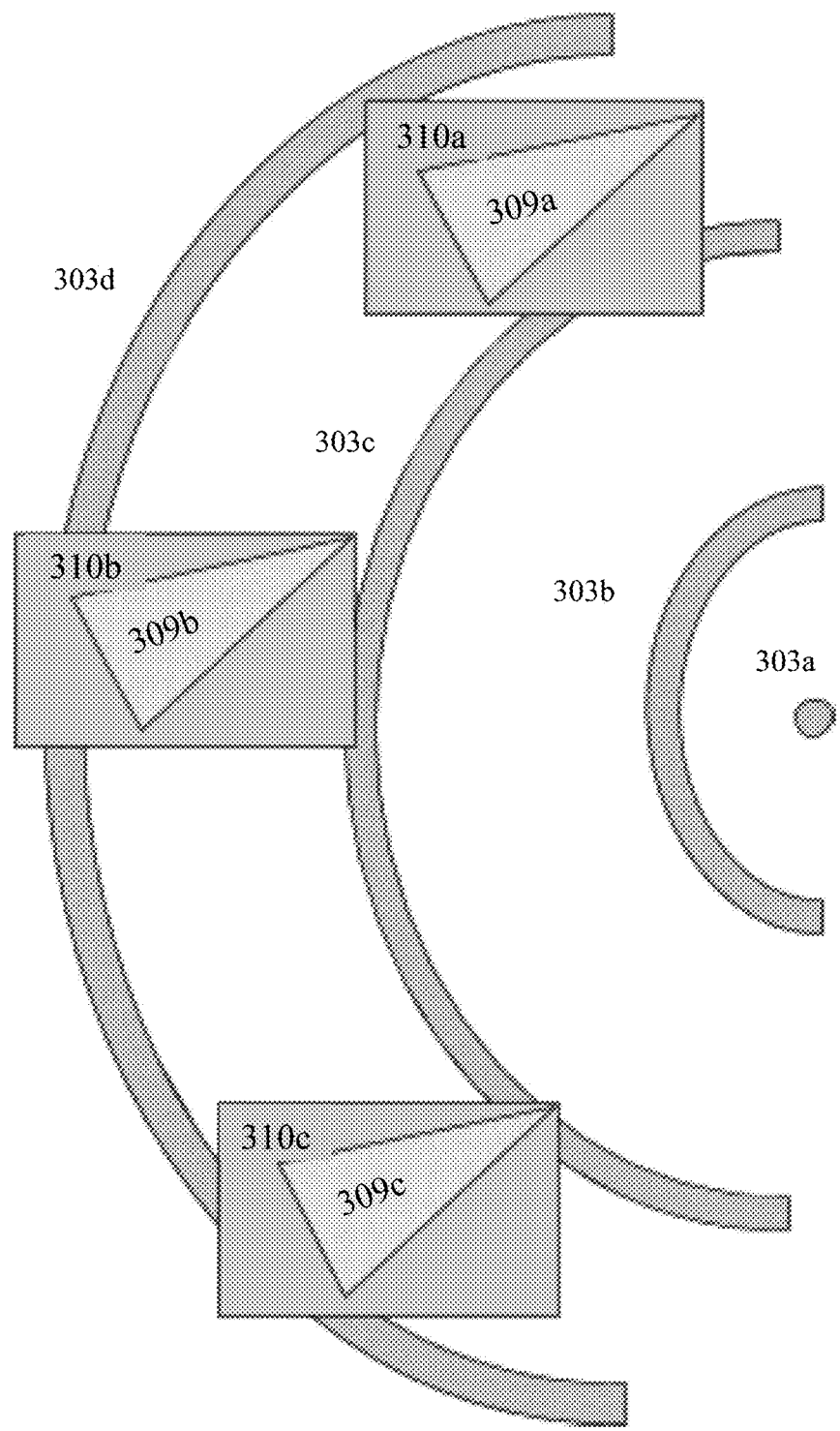
FIG. 3A is a simplified illustration of several buildings each being monitored by a security camera.

Referring now to FIG. 3, the present invention is applicable to a series of separate buildings 408*a*-408*c*. In the exemplary illustration, each building includes camera 409*a*-409*c*, respectively. Typically, additional SMAs would be present, but additional SMAs were omitted to preserve clarity.

Considering now, for example, that an earthquake has occurred near buildings 310, having a point of origin of 303*a*. The earthquake's tremors are felt from point 303*a* out to border 303*d*. As a result, each camera 309 in buildings 310 sends out motion sensor security alerts. In addition, the SMP is in communication with earthquake sensors. Using the traditional state of the art technology, the SMP would notify the SMP operator that there are four separate security alerts and each alert would be sent into the queue for processing. The SMP operator must then handle them all individually, which can take away valuable time that could be spent on other bona fide security events. Expanding on this example further, by considering that an earthquake can set off dozens of motion sensors, can shatter windows resulting in a plurality of window-breach security alerts, and can crumble doorways resulting in a plurality of door-breach security alerts, it is clear that the present invention can greatly reduce wasted time associated with processing a plurality of related security alerts as individually security events.

Figure 3B:
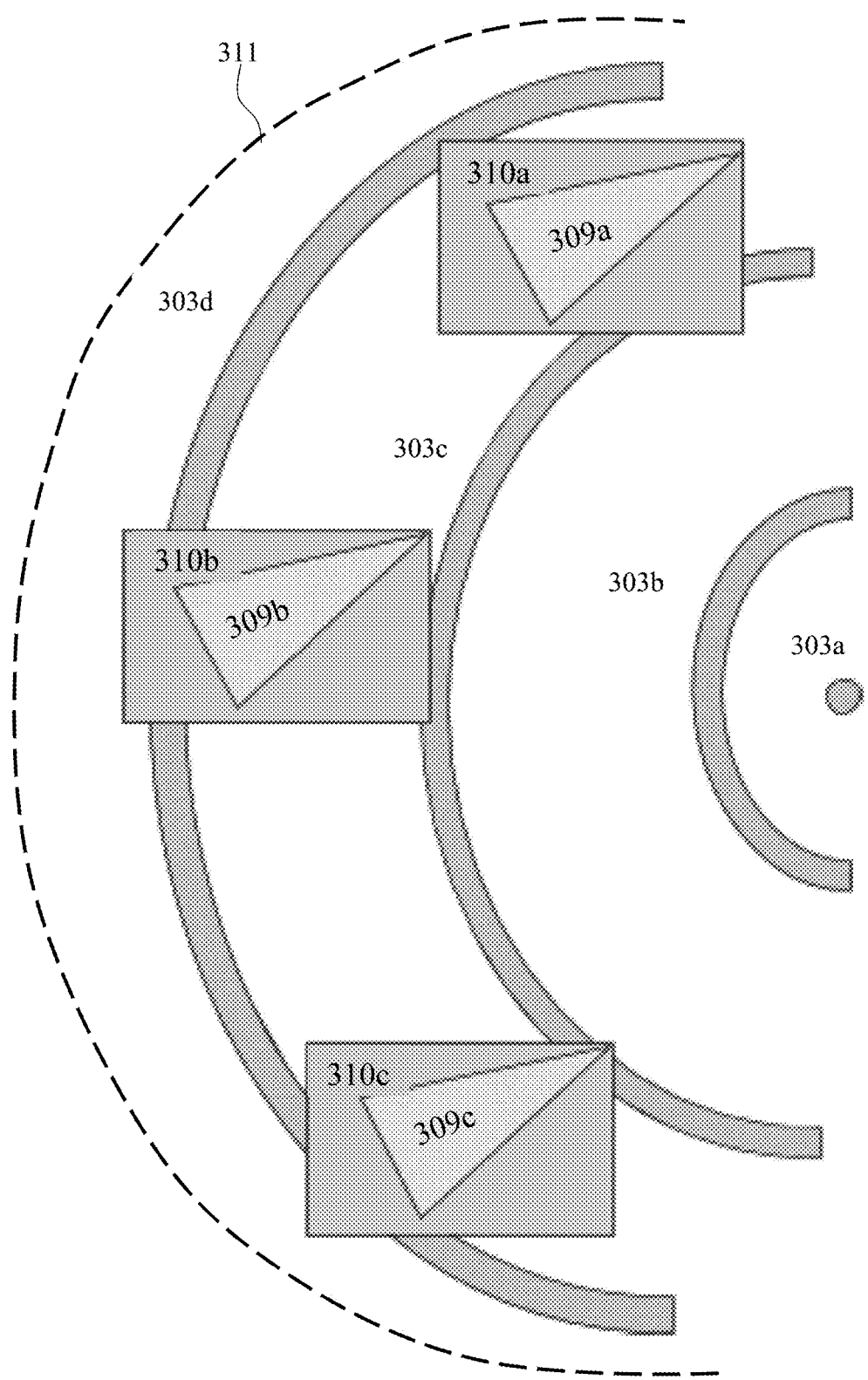
FIG. 3B is a depiction of the same layout provided in FIG. 3A with a representative relational zone overlaying the illustration.

Using the earthquake example and referring to FIG. 3B, the present invention identifies an alert as an earthquake alert and evaluates relational zone 311 for the earthquake sensor that caused the alert. The system then analyzes the locations of the other SMAs that sent a security alert to determine whether the SMAs fall within relational zone 311. Because cameras 309 each fall within relational zone 311, the present invention would group the motion sensor alerts into the same security event as the earthquake sensor and present a single security event to the SMP operator.

In determining whether security alerts are related, an embodiment of the present invention constantly monitors in the background security alerts that have yet to be fully processed to determine if any fall within the relational zone of any of the other pre-existing and/or future security alerts. An embodiment may constantly monitor every security alert or may simply conduct a single analysis for each security alert as it occurs. Continuous monitoring is beneficial because various types of SMAs may have different sized relational zones and subsequent security alerts may at some point reside within a relational zone of a security alerting SMA that has not yet been fully processed. In contrast, non-continuous monitoring reduces the necessary computing power and may avoid unnecessary and irrelevant associations between security alerts.

An embodiment may include a relational timeframe. A relational timeframe is a certain period of time after the initial triggering of a security alert, during which subsequent security alerts may be deemed to be related to the initial security alert. The present invention may rely solely on the relational timeframe or may use both the relational timeframe and the relational zones to determine if security alerts are related to a single security event. Like the relational zones, the relational timeframes may be customized for each type of SMA and/or each individual SMA, regardless of type. For example, a motion detection alert may have a relational zone of twenty feet and a relational timeframe of thirty minutes, a forced door alert may have a relational zone of twenty feet and a relational timeframe of forty-five minutes, and an earthquake alert may have a relational zone of one thousand feet and a relational timeframe of 5 minutes, with each of them being configurable.

Figure 4:
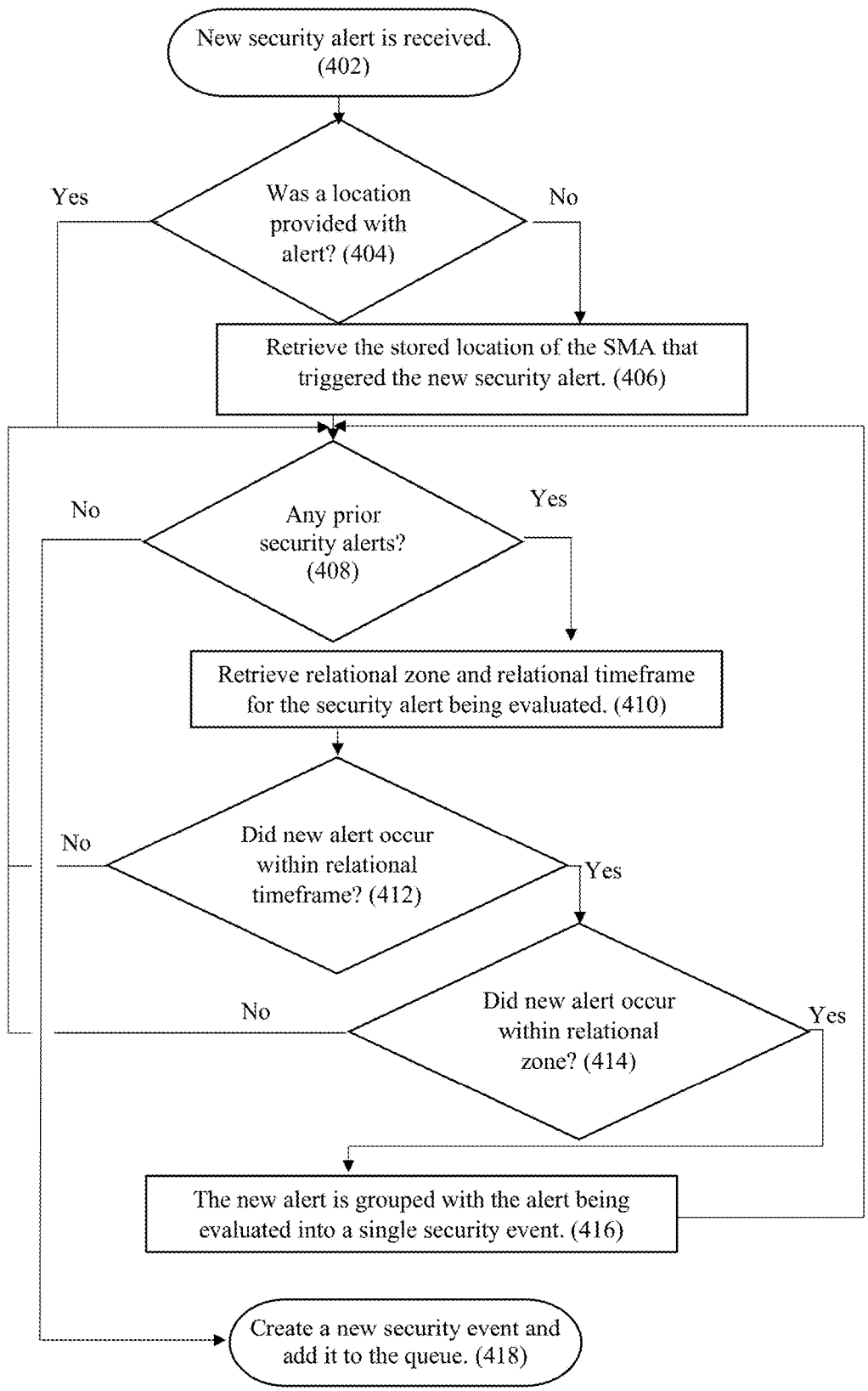
FIG. 4 is an exemplary flowchart of an embodiment of the novel method of the present invention.

Referring now to FIG. 4, a flow chart exemplifies the novel method of grouping security alerts into a single security event using both relational zones and relational timeframes. The process is initiated when a new security alert is received at step 402. The system automatically, determines if the location of the SMA responsible for the security alert was provided with the security alert at step 404. If the location was not provided, then the system accesses a data store having location-based information for each SMA and retrieves the stored location for the SMA responsible for the security alert at step 406.

At step 408, the system determines whether there are any prior security alerts or security events that have occurred within a configurable timespan (e.g., 1 hour) starting, preferably with the most recent, that have not yet been evaluated. If there are any security alerts or events that have occurred within the designated timespan and have yet to be evaluated, the type and the location of the most recent alert is identified and the relational zone and relational timeframe of said alert is retrieved at step 410. The time between the new security alert and the alert being evaluated is compared to determine if the new security alert occurred within the established relational timeframe at step 412. If the new alert is outside of the relational timeframe, the process reverts back to step 408 to determine if there are any prior security alerts within the established timespan that have not been evaluated.

If the new alert occurred within the relational timeframe, the system determines if the SMA responsible for the alert occurred within the relational zone of the security alert being evaluated at step 414. If the SMA is located outside of the relational zone, the process again reverts back to step 408. If the SMA is located in the relational zone associated with the security alert being evaluated, the new alert is grouped with the alert being evaluated into a single security event at step 416. The process then reverts back to step 408 to evaluate the next prior security alert. If there are no prior security alerts that have yet to be evaluated, a new security event is created for this new security alert at step 418.

GLOSSARY OF CLAIM TERMS

Data Store: is any hardware or software capable of storing information.

Location Information: is information that conveys the relative position of an object to another object.

Location-Based Technology: is a device configured to provide the location of something or someone.

Relational Timeframe: is a defined timespan.

Relational Zone: is a defined physical or virtual geographic boundary near or around a particular SMA.

Security Alert: is a signal from an SMA to an SMP.

Security-monitoring Asset: is any monitoring object, including, but not limited to, alarm sources, video sources, outputs, security guards, audio sources, and situational awareness devices to provide information outside of traditional alarm sources, such as earthquake and weather warnings.

Security-Monitoring Platform: is a computer-based system in communication with one or more security systems designed to allow an operator to monitor and sometimes control the security system and its electronic security-monitoring assets.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer implemented method for automatically grouping security alerts into a single security event to be processed on a security-monitoring platform, comprising:
   receiving an active security alert from a security-monitoring asset;
   receiving or retrieving location information for the security-monitoring asset;
   responsive to a second security alert being triggered within a first defined timespan that is based on a start time of the active security alert, retrieving both a geographical boundary and a second defined timespan for the second security alert, wherein the second defined timespan has an end time calculated based on a start time of the second security alert;
   calculating if the active security alert occurred within the second defined timespan;
   determining whether the security-monitoring asset responsible for the active security alert is located within the geographic boundary of the second security alert; and
   responsive to the active security alert occurring within the second defined timespan and the security-monitoring asset responsible for the active security alert being located within the geographic boundary of the second security alert, grouping the active security alert with the second security alert into a single security event for processing through the security-monitoring platform;
   responsive to the active security alert occurring outside of the geographic boundary or the active security alert occurring outside of the second defined timespan:
     disregarding the second security alert;
     reverting back to the step of determining if a subsequent security alert was triggered within the first defined timespan, wherein the disregarded second security alert is not considered; and
   creating a new security event for processing through the security-monitoring platform in response to the active security alert occurring outside of the geographic boundary and the second security alert not being triggered within the second defined timespan.

2. The method of claim 1, wherein the step of receiving or retrieving location information for the security-monitoring asset further includes retrieving location information from a data store accessible by the security-monitoring platform if the location information is not received from location-based technology coupled to the security-monitoring asset.

3. The method of claim 1, wherein the step of receiving or retrieving location information for the security-monitoring asset further includes retrieving location information from location-based technology coupled to the security-monitoring asset.

4. The method of claim 1, further including the step of creating a new security event for processing through the security-monitoring platform if the active security alert occurred outside of the geographic boundary.

5. The method of claim 1, further including the step of creating a new security event for processing through the security-monitoring platform if the second security alert was not triggered within the second defined timespan.

6. A computer implemented method for automatically grouping security alerts into a single security event to be processed on a security-monitoring platform, comprising:
   receiving an active security alert from a security-monitoring asset;
   receiving location information and a geographic boundary for the security-monitoring asset from location-based technology coupled to the security-monitoring asset or retrieving location information for the security-monitoring asset from a data store;
   responsive to a second security alert triggered within a first defined timespan that is based on a start time of the active security alert, retrieving both a second defined timespan and a location for the second security alert, wherein the second defined timespan has an end time calculated based on a start time of the second security alert;
   calculating if the active security alert occurred within the second defined timeframe of the second security alert;

calculating whether the location of the second security alert is within a measured geographical distance from the active security alert; and responsive to the active security alert occurring within the second defined timespan and the second security alert being located within the measured geographic distance from the active security alert, grouping the active security alert with the second security alert into a single security event for processing through the security-monitoring platform;

responsive to the active security alert occurring outside of the measured geographic boundary or the active security alert occurring outside of the second defined timespan:
  disregarding the second security alert;
  reverting back to the step of determining if a subsequent security alert was triggered within the first defined timespan, wherein the disregarded second security alert is not considered; and
creating a new security event for processing through the security-monitoring platform in response to the active security alert occurring outside of the geographic boundary and the second security alert not being triggered within the second defined timespan.

7. The method of claim 6, further including the step of creating a new security event for processing through the security-monitoring platform if the second security alert occurred outside of the measured geographic distance from the active security alert and no additional security alerts were triggered within the first defined timespan.

8. An automated system for grouping security alerts into a single security event to be processed on a security-monitoring platform, comprising:
  a plurality of security-monitoring assets, each security-monitoring asset having a location-based technology;
  a security-monitoring platform in communication with the plurality of security-monitoring assets, such that the security-monitoring platform can receive an active security alert and location-based information from a security-monitoring asset;
  the system configured to perform the following steps in response to the security-monitoring platform receiving an active security alert from one of the security-monitoring assets:
    receiving location information for the security-monitoring asset that triggered the active security alert;
    determining if a second security alert was triggered within a first defined timespan, based on a start time of the active security alert;
    responsive to the second security alert triggered within the first defined timespan, retrieving a second defined timespan for the second security alert, wherein the second defined timespan has an end time calculated based on a start time of the second security alert;
    determining if the active security alert occurred within the second defined timespan;
    determining if the security-monitoring asset responsible for the active security alert is located within a geographic boundary of the second security alert or if the second security alert occurred within a geographic boundary of the active security alert; and
    responsive to the active security alert occurring within the second defined timespan and the security-monitoring asset responsible for the active security alert being located within the geographic boundary of the second security alert or the second security alert occurring within the geographic boundary of the active security alert, grouping the active security alert with the second security alert into a single security event for processing through the security-monitoring platform;
    responsive to the active security alert occurring outside of the geographic boundary of the prior security alert, or the active security alert occurring outside of the second defined timespan:
      disregarding the second security alert;
      reverting back to the step of determining if a subsequent security alert was triggered within the first defined timespan, wherein the disregarded second security alert is not considered; and
    creating a new security event for processing through the security-monitoring platform if the active security alert occurred outside of the geographic boundary of the second security alert, the second security alert occurred outside of the geographic boundary of the active security alert, and no second security alert was triggered within the first defined timespan.

9. The system of claim 8, wherein the step of receiving location information for the security-monitoring asset further includes retrieving location information from a data store accessible by the security-monitoring platform if the location information is not received from location-based technology coupled to the security-monitoring asset.

10. The system of claim 8, wherein the step of receiving or retrieving location information for the security-monitoring asset further includes retrieving location information from location-based technology coupled to the security-monitoring asset.

11. The system of claim 8, further including the step of creating a new security event for processing through the security-monitoring platform if no second security alert was triggered within the first defined timespan.

12. The system of claim 8, further including a data store accessible to the security-monitoring platform, in which the geographic boundaries for each security-monitoring asset are stored.

13. The system of claim 8, further including a data store accessible to the security-monitoring platform, in which the first and the second defined timespans for each security-monitoring asset are stored.

* * * * *